US00RE50196E

(19) United States
(12) Reissued Patent
Gosselin et al.

(10) Patent Number: US RE50,196 E
(45) Date of Reissued Patent: Nov. 5, 2024

(54) DESKTOP LASER CUTTER

(71) Applicant: Glowforge Inc., Seattle, WA (US)

(72) Inventors: Mark Gosselin, Seattle, WA (US); Anna-Pia Slothower, Sausalito, CA (US); Erich Slothower, Sausalito, CA (US); John Plunkett, Sausalito, CA (US)

(73) Assignee: Glowforge Inc., Seattle, WA (US)

(21) Appl. No.: 29/856,963

(22) Filed: Oct. 18, 2022

Related U.S. Patent Documents

Reissue of:
(64) Patent No.: Des. 850,528
Issued: Jun. 4, 2019
Appl. No.: 29/586,721
Filed: Dec. 6, 2016

U.S. Applications:
(62) Division of application No. 29/540,496, filed on Sep. 24, 2015, now Pat. No. Des. 827,705.

(51) LOC (14) Cl. ..... 18-04
(52) U.S. Cl.
USPC ..... D18/34.3; D18/50
(58) Field of Classification Search
USPC ..... D18/36, 43, 39, 47, 34.3, 50, 56, 59; D9/414, 419, 430, 431; D14/498, 500; D23/364, 365; D15/127
(Continued)

(56) References Cited

U.S. PATENT DOCUMENTS 2,654,794 A 10/1953 Zaugg
D197,096 S * 12/1963 Gugelot ..... D18/36
(Continued)

OTHER PUBLICATIONS

Chua, Mike. "Dremel Unveils "First-of-its-kind" Desktop Digilab Laser Cutter". Sep. 25, 2017, 3pages. [retrieved on Oct. 24, 2017]. Retrieved from Internet: URL: <https://mikeshouts.com/the-dremel-digilab-laser-cutter/>.
(Continued)

*Primary Examiner* — Philip S Hyder
(74) *Attorney, Agent, or Firm* — LEE SULLIVAN SHEA & SMITH LLP

(57) CLAIM

The ornamental design for a desktop laser cutter, as shown and described.

DESCRIPTION

FIG. 1 is a top-left perspective view showing an embodiment of the desktop laser cutter;
FIG. 2 is a right side elevational view thereof;
FIG. 3 is a left side elevational view thereof;
FIG. 4 is a front elevational view thereof;
FIG. 5 is a rear elevational view thereof;
FIG. 6 is a top plan view thereof; and
FIG. 7 is a bottom plan view thereof.
FIG. 8 is a top-left perspective view showing a second embodiment of the combined desktop laser cutter and filter;
FIG. 9 is a right side elevational view thereof;
FIG. 10 is a left side elevational view thereof;
FIG. 11 is a front elevational view thereof;
FIG. 12 is a rear elevational view thereof;
FIG. 13 is a top plan view thereof; and,
FIG. 14 is a bottom plan view thereof.
The broken lines in the drawings illustrate environment and portions of the desktop laser cutter, which form no part of the claimed design.

1 Claim, 14 Drawing Sheets

Matter enclosed in heavy brackets [ ] appears in the original patent but forms no part of this reissue; matter printed in italics indicates the additions made by reissue.

(58) Field of Classification Search
CPC .. B23K 26/38; B23K 37/0276; B23K 26/362; B23K 26/0823; B23K 26/042; B23K 26/128; G03G 15/0836; G03G 15/0837; G03G 15/0867; G03G 15/0832; G03G 15/0834; G03G 15/0877; G03G 15/0868; G03G 15/50; G03G 15/0872; G03G 15/0898; G03G 15/5016; G03G 15/60; G03G 15/65
See application file for complete search history.

(56) References Cited

U.S. PATENT DOCUMENTS

D241,821 S 10/1976 Jewell
4,192,062 A 3/1980 Balde et al.
D264,791 S 6/1982 Conti
4,387,949 A 6/1983 Haitmanek
4,463,998 A 8/1984 Reavis et al.
D281,247 S 11/1985 Lahey et al.
D286,639 S 11/1986 Strand
D290,091 S 6/1987 Ware et al.
D293,082 S 12/1987 Butler
4,723,857 A 2/1988 Yokoi
D295,186 S 4/1988 Hadtke
D336,918 S 6/1993 Yonezawa et al.
D343,754 S 2/1994 Pierce et al.
5,694,295 A 12/1997 Mochizuki et al.
D413,919 S 9/1999 Kobayashi et al.
D439,608 S 3/2001 Gassett et al.
D462,087 S * 8/2002 Dwyer ..... D18/55
D465,600 S 11/2002 Dolan
D468,765 S 1/2003 Kobayashi et al.
6,580,388 B1 * 6/2003 Stoyanov ..... G01S 7/411 342/192
D488,352 S 4/2004 Tisdale et al.
D489,754 S 5/2004 Akahane et al.
D491,220 S 6/2004 Whitehorn et al.
D493,913 S 8/2004 Kwok
D501,503 S 2/2005 Leong et al.
D519,151 S * 4/2006 Tashiro ..... D18/54
D523,841 S * 6/2006 Van Kastel ..... D14/188
D536,373 S * 2/2007 Inoue et al. ..... D18/55
D544,907 S 6/2007 Tjin Wong Joe et al.
D552,167 S 10/2007 Lee et al.
D558,266 S 12/2007 Falk
D558,822 S * 1/2008 Smith ..... D18/55
D562,126 S 2/2008 Kienemund-Paroll
D574,360 S * 8/2008 Matsuoka ..... D14/168
D575,635 S 8/2008 Rozenzweig
D585,427 S * 1/2009 Lee ..... D14/204
D589,876 S 4/2009 Hong et al.
D599,736 S * 9/2009 Ferber ..... D13/108
D603,894 S 11/2009 Yamano et al.
D607,506 S 1/2010 Kim et al.
D610,589 S 2/2010 Chia et al.
D614,234 S * 4/2010 Ishikawa ..... D18/55
7,784,782 B2 8/2010 Cook et al.
D624,639 S * 9/2010 Dilorenzo ..... D23/365
D641,395 S * 7/2011 Park ..... D18/55
D643,301 S 8/2011 Consylman
D649,236 S 11/2011 Bilko et al.
D661,346 S 6/2012 Suzuki et al.
D665,445 S 8/2012 Emmenegger et al.
D666,088 S 8/2012 Anderson et al.
D667,050 S 9/2012 Takeuchi
D669,473 S * 10/2012 Gronau ..... D14/420
D670,885 S * 11/2012 Merrick ..... D99/37
D674,010 S 1/2013 Nanno
D681,107 S 4/2013 Larson et al.
D682,329 S * 5/2013 Day ..... D15/146
D684,465 S 6/2013 Vernon et al.
D699,726 S 2/2014 Seki et al.
D700,840 S 3/2014 Vernon et al.
D706,269 S * 6/2014 Qian ..... D14/422
D708,229 S 7/2014 Onoue et al.
D716,428 S * 10/2014 Farone ..... D23/364
8,909,085 B2 * 12/2014 Short ..... G03G 15/6552 399/81
D723,562 S 3/2015 Inada et al.
D727,328 S * 4/2015 Nanno ..... D14/421
D727,790 S 4/2015 Ramadan
D730,942 S * 6/2015 Wong ..... D14/203.1
D735,310 S * 7/2015 Drew ..... D23/365
D735,723 S * 8/2015 He ..... D14/422
D736,709 S 8/2015 Byrne et al.
D744,031 S 11/2015 Tanaka et al.
9,278,553 B2 3/2016 Nakano et al.
9,301,031 B2 3/2016 Gengler et al.
D754,787 S 4/2016 Yoshioka et al.
D757,164 S 5/2016 Hiraga
9,332,667 B2 5/2016 Namba
D761,903 S 7/2016 Matsumoto
D765,772 S 9/2016 Clark, III et al.
D766,359 S 9/2016 Takahashi
D767,940 S 10/2016 Gross et al.
D768,768 S * 10/2016 Takahashi ..... D18/50
D770,565 S * 11/2016 Tanaka ..... D18/50
D777,248 S * 1/2017 Oguchi ..... D18/50
D781,955 S * 3/2017 Kim ..... D18/50
D786,348 S * 5/2017 Mita ..... D18/56
D786,964 S 5/2017 Clark, III et al.
D792,508 S * 7/2017 Nakagawa ..... D18/50
D795,338 S * 8/2017 Umezawa ..... D18/34.3
9,771,233 B2 * 9/2017 Miura ..... B65H 31/02
D799,590 S * 10/2017 Dwyer ..... D18/50
D799,593 S * 10/2017 Kim ..... D18/55
D800,212 S * 10/2017 Nanno ..... D18/19
D809,593 S 2/2018 Tashima
D827,705 S * 9/2018 Gosselin ..... D18/34.3
D849,834 S 5/2019 Gosselin et al.
2003/0180058 A1 9/2003 Alegria et al.
2009/0310997 A1 12/2009 Lee et al.
2011/0019347 A1 1/2011 Imai
2013/0108317 A1 5/2013 Tsuchiya

OTHER PUBLICATIONS

You Tube. "Mr Beam's laser cutter", May 8, 2017, 1 page. [retrieved on Oct. 24, 2017], Retrieved from the Internet: URL: <https://www.youtube.com/watch?v=8goXAmSncZE>.
Youtube. "Meet the Glowforge 3D Laser Printer", Sep. 24, 2015, 1 page. [retrieved on Jul. 24, 2017], Retrieved from the Internet: URL:<https://www.youtube.com/watch?v=0R3mMUsHFvU>.
Youtube. "Full Spectrum Muse Hobby Laser", May 6, 2017, 1 page. [retrieved on Jul. 24, 2017], Retrieved from the Internet: URL: <https://www.youtube.com/watch?v=SEF6k-Zsl5A>.
Youtube. "Epilog Mini 18 Laser Engraver Unboxing Video", Mar. 1, 2015, 1 page. [retrieved on Jul. 24, 2017], Retrieved from the Internet: URL: <https://www.youtube.com/watch?v=EcyPL_3J8Mc>.
Youtube. "Full Spectrum Laser Pro Series CO2", Jun. 28, 2016, 1 page. [retrieved on Jul. 24, 2017], Retrieved from the Internet: URL: <https://www.youtube.com/watch?v=gJthUfZHA0w>.
Mike Shouts—Laser Cutter, announced Sep. 25, 2017 [online], [site visited Oct. 24, 2017]. Available from internet, URL: <https://mikeshouts.com/the-dremel-digilab-laser-cutter/>.*

* cited by examiner

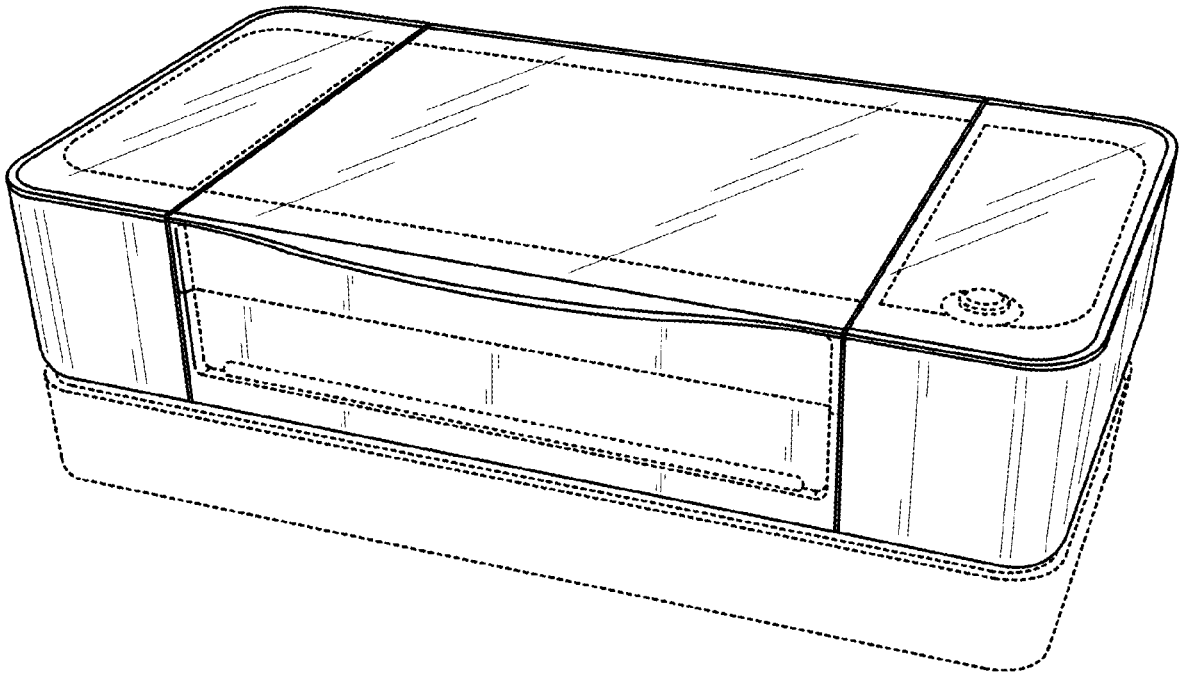
FIG. 1
(AMENDED)

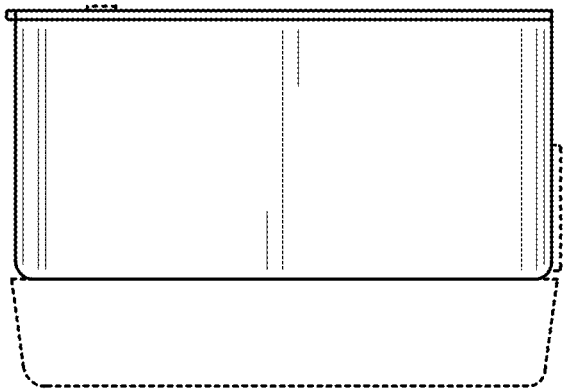
FIG. 2
(AMENDED)

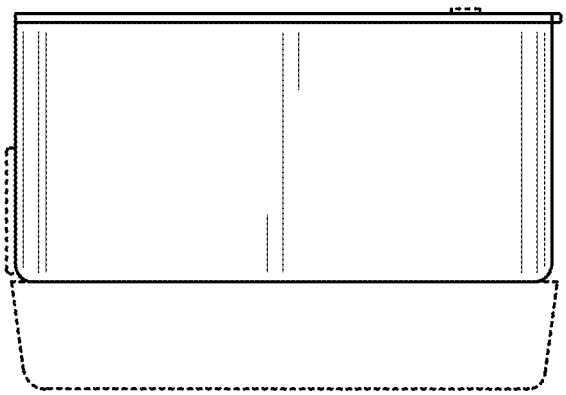
FIG. 3
(AMENDED)

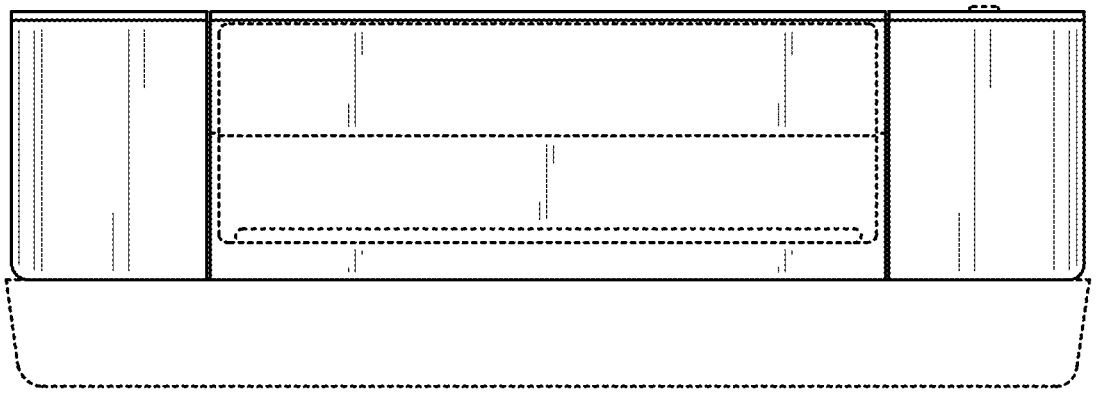
FIG. 4
(AMENDED)

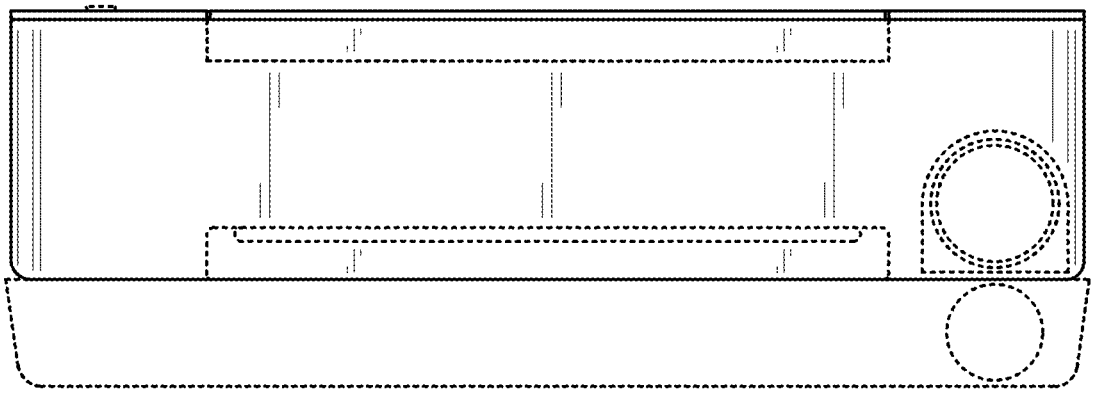
FIG. 5
(AMENDED)

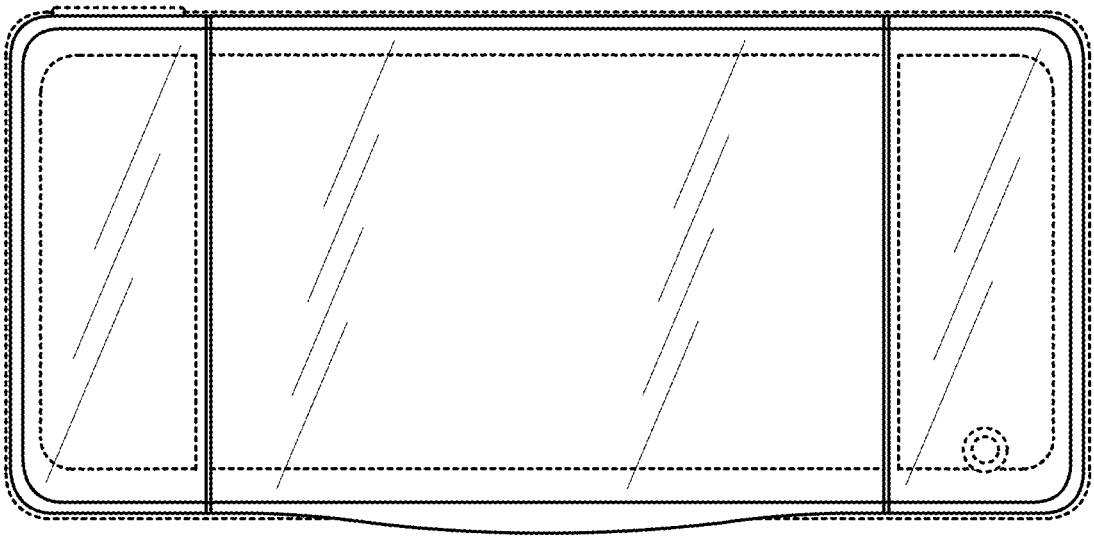
FIG. 6
(AMENDED)

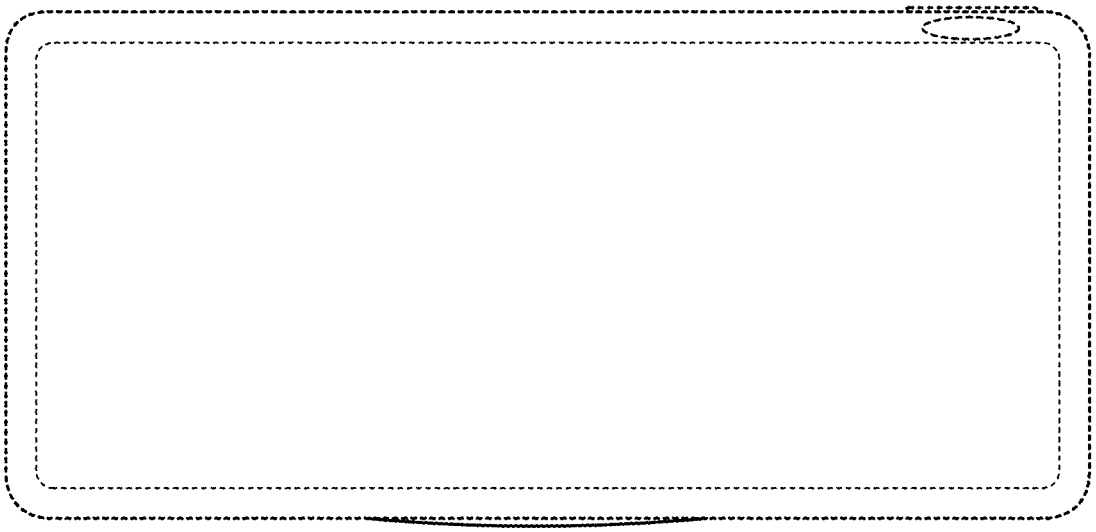
FIG. 7
(AMENDED)

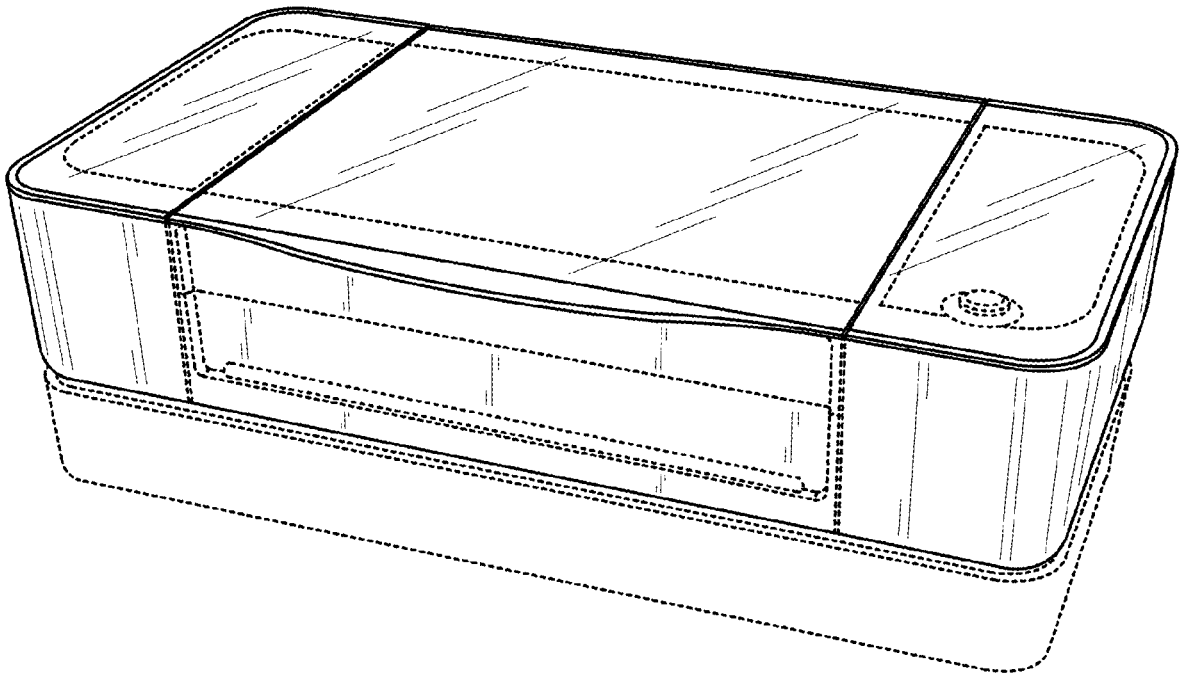
FIG. 8
(AMENDED)

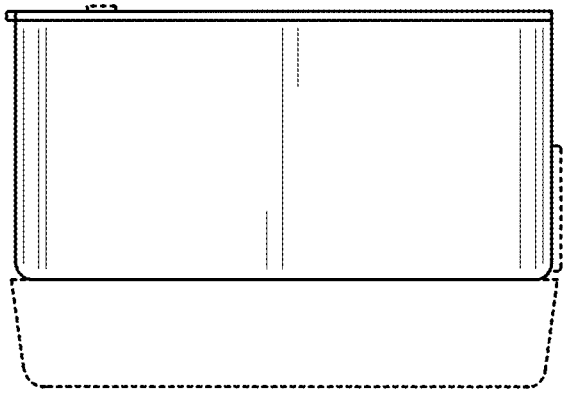
FIG. 9
(AMENDED)

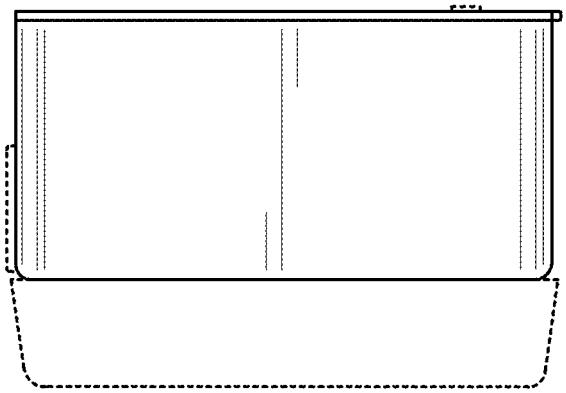
FIG. 10
(AMENDED)

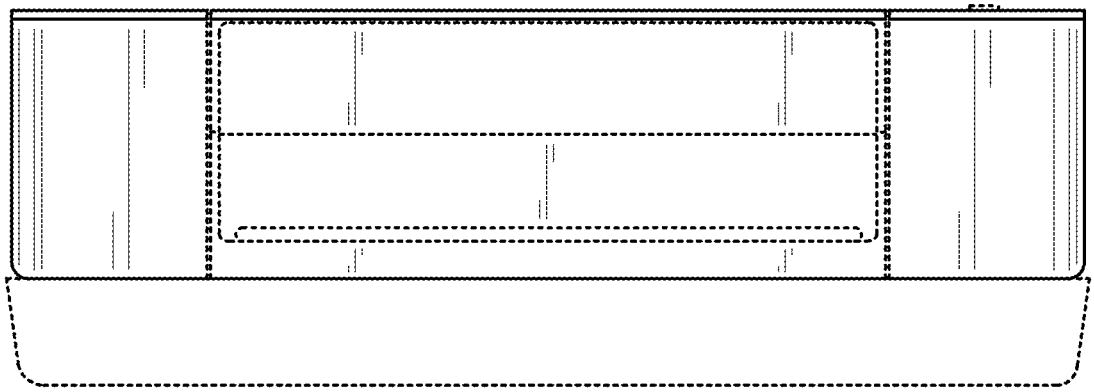
FIG. 11
(AMENDED)

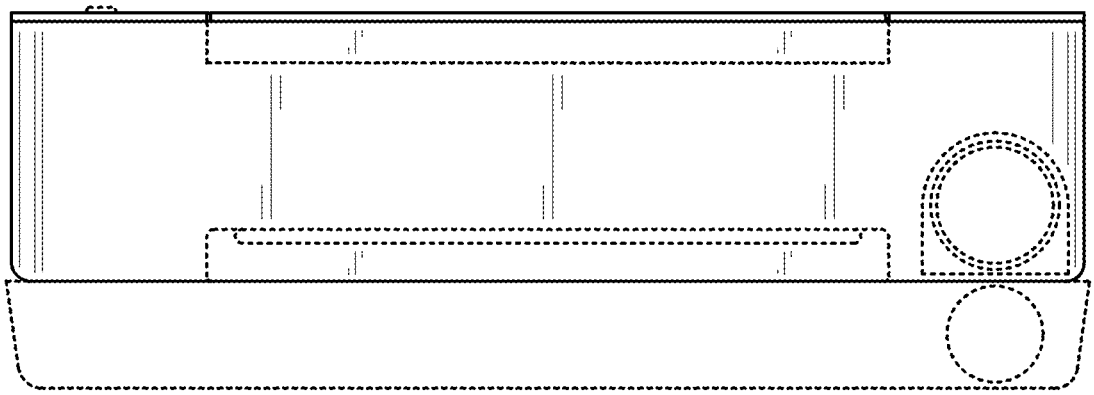
FIG. 12
(AMENDED)

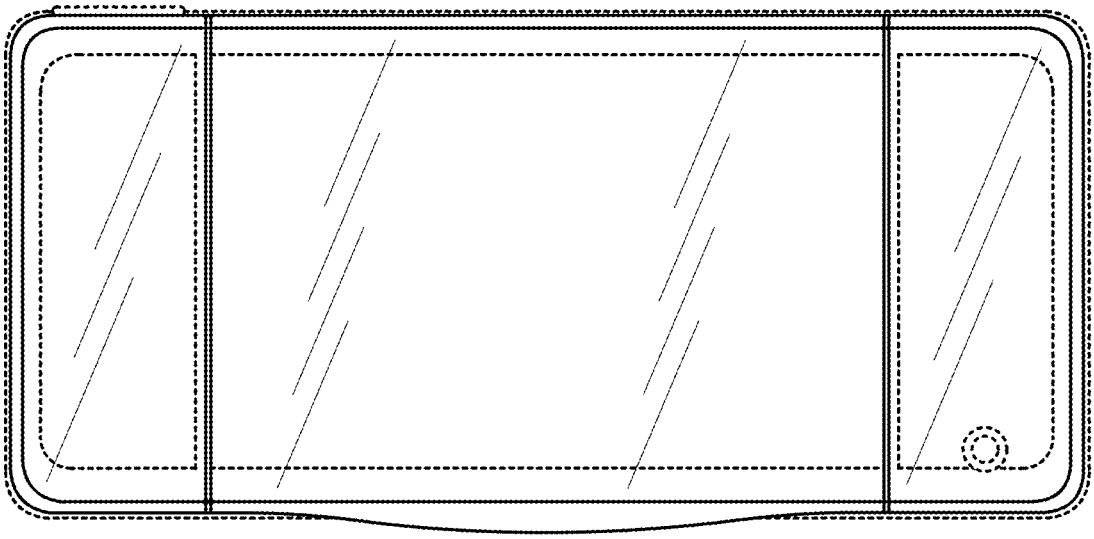
FIG. 13
(AMENDED)

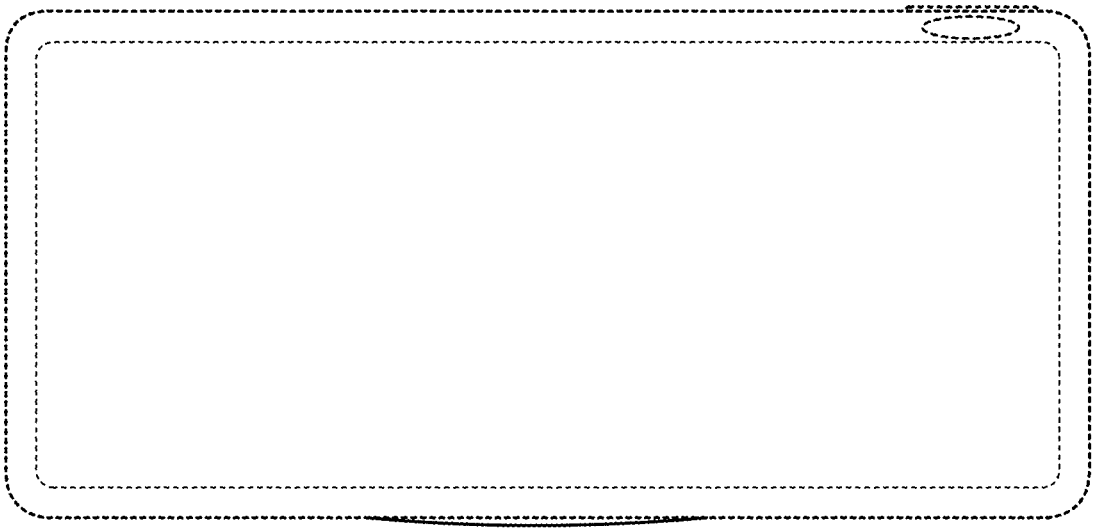
FIG. 14
(AMENDED)